Aug. 29, 1961
W. AMES
2,997,909
SAFETY COUPLING PIN
Filed June 8, 1959
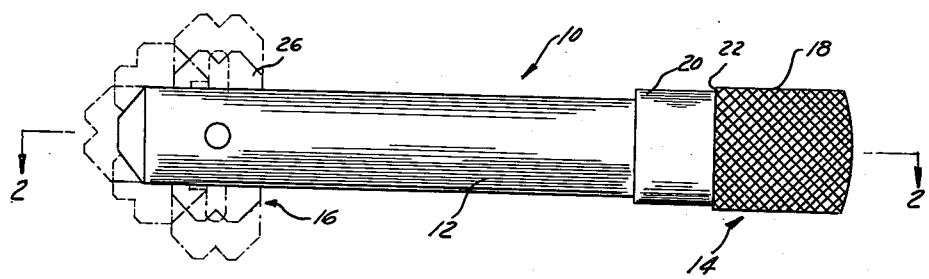
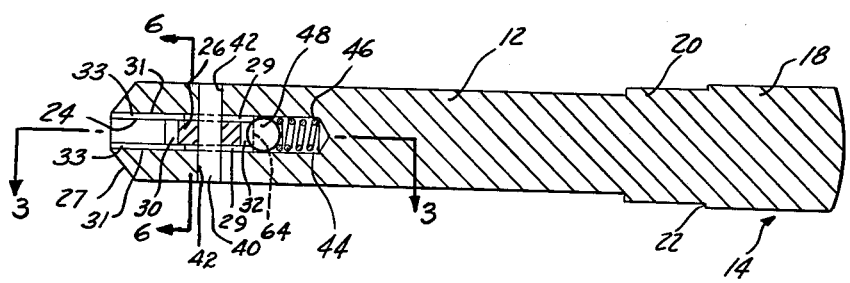
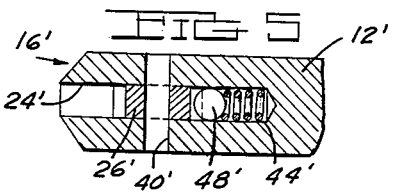
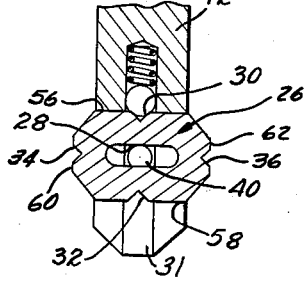
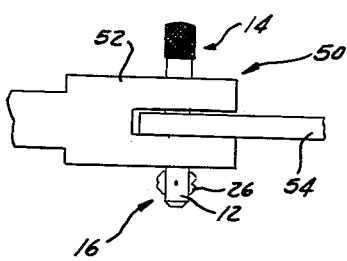
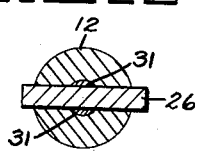
INVENTOR.
*WILFRED AMES*
BY
*SMITH, WILSON, LEWIS & McRAE*

United States Patent Office 2,997,909
Patented Aug. 29, 1961

2,997,909
SAFETY COUPLING PIN
Wilfred Ames, 4650 S. Telegraph, Dearborn, Mich.
Filed June 8, 1959, Ser. No. 824,448
3 Claims. (Cl. 85—3)

The present invention relates generally to coupling pins and more particularly to a coupling pin provided with a safety catch mechanism to prevent the pin from working out of engagement from a coupling which it is intended to secure. This application is a continuation-in-part of my former application Serial No. 703,932, filed December 19, 1957, and now abandoned.

Coupling pins generally have a tendency to work loose when used to couple a tractor to a trailer or farm implement, or the like. The movement and pressure of the hitch tend to force the pin outward. This creates a very dangerous situation for the driver of the tractor and others in the vicinity. There is also the danger of damaging the equipment or freight being hauled.

According to the present invention, a pin is provided with a safety catch that is readily opened or closed for insertion or extraction from a coupling. However, the catch will not open or close unless pressure is applied in a direction normal to the central axis of the pin. Since the pressures of the coupling are usually parallel to the axis of the pin, there is very little chance that the pin can be inadvertently opened while in use. The catch also has a contour such that it will not easily be caught by or entangled with plant growth such as bushes or vines or other material over which the tractor may be operating. The mechanism is also sturdy and durable under hard usage.

Therefore, a principal object of the present invention is the provision of a coupling pin having a safety catch at one end.

Another object of the present invention is the provision of a coupling pin having a safety catch which, when opened, will not readily engage entangling material through which it may pass.

A further object of the present invention is the provision of such a pin wherein the catch is readily opened or closed when desired but which will not open accidentally or inadvertently while in use.

Another object of the invention is to provide a safety catch mechanism in which the working parts are effectively sealed from the atmosphere to prevent being clogged with dust and other foreign matter.

A further object of the present invention is the provision of a safety coupling pin having a buffer zone adjacent the handle portion which will receive the normal abrasive contacts of the moving parts of a trailer hitch and thus avoid damage to the handle portion.

Other objects of this invention will appear in the following description and appended claims, reference being had to the accompanying drawings forming a part of this specification wherein like reference characters designate corresponding parts in the several views.

In the drawings:

FIG. 1 is a side elevational view of one embodiment of the present invention.

FIG. 2 is a side elevational view in section taken substantially along the line 2—2 of FIG. 1 looking in the direction of the arrows.

FIG. 3 is a side elevational view in section taken substantially along the line 3—3 of FIG. 2 looking in the direction of the arrows.

FIG. 4 is a side elevational view of a coupling showing the coupling pin inserted and locked in place.

FIG. 5 is a sectional view of a second embodiment of a catch mechanism for the pin shown in FIGS. 1 and 2.

FIG. 6 is a sectional view taken substantially along the line 6—6 of FIG. 2 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As best seen in FIGS. 1 and 2, the coupling pin of the present invention, generally designated by the numeral 10, comprises a cylindrical stem portion 12, a handle portion 14 and a locking mechanism 16.

The handle portion 14 comprises an enlarged head 18 which may be knurled to provide a good gripping surface. Immediately adjacent the head 18 is a second enlarged buffer portion 20 of a slightly smaller diameter to form a shoulder 22. The buffer portion 20 serves to protect the knurled surface of the head 18 against damage. Such pins 10 are frequently used to locate swingable members, such as tie rods, at an angle to a tractor. When thus used, the pin is subjected to considerable impact and abrasive contact with the positioned member whereby the gripping surface is soon flattened and smoothed out. The shoulder 22 holds such members against sliding movement along the central axis of the pin 10 and the buffer portion 20 absorbs the impact and abrasive stresses. The diameter of the buffer head portion 20 is somewhat larger than the diameter of the stem 12 to form the desired enlarged head portion.

The insertable end of the coupling pin 10 has an open ended diametrically extending slot 24 to receive a retainer plate 26. The stem 12 may be tapered near the end as at 27 to facilitate insertion into a coupling. As may be seen in FIG. 3, the retainer 26 is a generally rectangular member. An elongated opening 28 is provided in the retainer 26 having its major axis approximately coincident with the longitudinal axis of the retainer 26. The four corners of the retainer 26 are cut away to define an octagonal contour. Diametrically opposed V notches 30, 32, 34, 36 are provided centrally in the sides 56, 58 and ends 60, 62 of the retainer 26.

The retainer 26 is pivotally and slidably mounted on a pin 40 within the slot 24. The pin 40 is mounted, preferably by means of a press fit, transversely of the slot 24 and diametrically of the stem 12 in openings 42 of the stem 12. A circular recess 44 is provided in the stem 12 extending axially from the bottom 64 of the slot 24. The recess 44 receives a spring 46 and ball 48 for the purpose of releasably locking the retainer 26 in position by engaging one of the notches 30, 32, 34, 36. The ball and spring are held in assembled relation in the recess 44 by the retainer 26.

FIGS. 1 and 2 show the retainer 26 at right angles to the stem 12 and releasably locked in position by means of the ball 48 engaging the notch 32. As indicated in phantom, the retainer 26 may be moved to a position in line with the stem 12 by first sliding the retainer 26 outwardly in either direction and then rotating it about the pin 40 whereby the spring 46 will urge the ball 48 into engagement with one of the notches 34, 36. The width of the retainer 26 is approximately equal to the diameter of the stem 12 so that the retainer 26 will not interfere with the insertion of the stem 12 into a coupling.

The eight sided configuration of the retainer 26 defines a periphery which may be easily pivoted about the pin 40. Each point along the periphery is substantially equidistant from the elongated opening 28. This permits the retainer 26 to be mounted on the pin 40 with the bottom surface 64 in facial engagement with the sides 56, 58 when the retainer member is pivoted to a locking position with its longitudinal axis at right angles to the axis of the stem 12. This arrangement provides several advantages. Facial engagement of the retainer sides and the bottom of the slot seals the recess 44 from dust and other foreign matter which would eventually jam the spring. In addition, the ball 48 is prevented from escaping as it engages the notches 30, 32, 34, 36 while it is still projecting partially into the recess 44. A further advantage of this arrangement is that it requires a force parallel to the longitudinal axis of the retainer 26 to slide the retainer 26 outwardly when it is at right angles to the stem 12. Thus all other accidentally applied forces are prevented from sliding the retainer 26 out of its locking position. While the end portions of the retainer 26 are shown as a series of three angularly disposed faces, more faces could be provided or the ends could be rounded in order to provide easy rotation for the retainer 26. It is preferable, however, to have flat ends 60, 62 to provide a stable locked condition when the retainer 26 is aligned with the stem 12.

The recess 44 is also sealed from the entrance of foreign matter via the slotted end of the stem 12. The principal seal is, of course, the retainer 26. However, where the diameter of the recess 44 is greater than the width of the retainer 26, as shown in FIG. 2, it is necessary to form a longitudinal groove 29 in each side wall 31 of the slot 24 to permit insertion of the spherical member 48 into the recess 44. The grooves 29 would permit the entrance of foreign matter. Therefore a plug 33, as best seen in FIGS. 2 and 6, is secured in each groove 29, as by soldering, to completely seal the locking means. The provision of the grooves 29 and the attendant sealing problem may be avoided, as illustrated in FIG. 5, by forming the recess 44' with a diameter equal to or less than the width of the slot 24'.

FIG. 4 illustrates the coupling pin 10 inserted and locked in a conventional pin and slot coupling 56. The handle portion 14 is seen to be abutting against the slot portion 52 of the coupling 50 while the stem 12 is inserted in openings provided in the slot portion 52 and pin portion 54 thus securing the coupling 50. The retainer 26 is locked at right angles to the stem 12 thereby holding the pin 10 within the coupling 50.

The coupling pin as described is durable in use, being capable of rough usage without damaging the working parts. The ball and spring locking arrangements cannot normally be dislodged unless the pin 40 fails in shear. While the locking mechanism is effective and relatively foolproof, the number of operating parts is minimal with very simple and inexpensive machinery operations being required for fabrication.

Having thus described my invention, I claim:

1. A coupling pin comprising an elongated cylindrical stem portion; an enlarged head portion at one end of the stem; and a locking mechanism at the other end of said stem comprising an open ended diametrically extending slot, a recess formed in said stem extending axially from the bottom of the slot, a pin extending transversely of the slot; an elongated retainer member pivotally and slidably mounted on said pin within the slot by means of an elongated opening extending centrally and longitudinally of the retainer member, the end portions of said retainer having a periphery which has a maximum spacing from the respective ends of said elongated opening less than the distance from said pin to the intersection of the bottom of said open ended slot with said recess, and having a width substantially equal to the diameter of the stem, the distance from the center of said retainer member to the longitudinal sides thereof being substantially equal to the distance from the center of said transverse pin to the bottom of said open ended slot, whereby the longitudinal side edges of the retainer member will be in facial contact with the bottom of said open ended slot when the retainer member is pivoted to a position with its longitudinal axis at right angles to the axis of the stem, a notch provided centrally in the outer surface of at least one side and one end of said retainer, a spherical member inserted in said recess, and a spring member in said recess urging said spherical member outwardly wherey to releasably engage one of the notches in said retainer member.

2. A coupling pin comprising an elongated stem; an enlarged head at one end of said stem; and releasable locking means at the other end of said stem; said locking means comprising an open ended diametrically extending slot in the end of said stem, a pin extending transversely of the slot, a recess formed in said stem extending axially from the bottom of said slot, an elongated generally rectangular retainer member pivotally and slidably mounted on said pin by means of an elongated opening extending centrally and longitudinally of the retainer member, the end portions of said retainer member being cut away to define a periphery that has a maximum spacing from the respective ends of said elongated opening less than the distance from said pin to the intersection of the bottom of said open ended slot with said recess, the distance from the center of said retainer member to the longitudinal sides thereof being substantially equal to the distance from the center of said transverse pin to the bottom of said open ended slot whereby the longitudinal side edges of the retainer member will be in facial contact with the bottom of said open ended slot when the retainer member is pivoted to a position with its longitudinal axis at right angles to the axis of the stem, a notch provided centrally in the outer surface of at least one side and one end of said retainer member, said recess having a diameter equal to or less than the width of said slot; a spherical member inserted in said recess, and a spring member in said recess urging said spherical member outwardly whereby to releasably engage one of the notches in said retainer member.

3. A coupling pin comprising an elongated stem; an enlarged head at one end of said stem; and releasable locking means at the other end of said stem; said locking means comprising an open ended diametrically extending slot in the end of said stem, a pin extending transversely of the slot, a recess formed in said stem extending axially from the bottom of said slot, an elongated generally rectangular retainer member pivotally and slidably mounted on said pin by means of an elongated opening extending centrally and logitudinally of the retainer member, the end portions of said retainer member being cut away to define a periphery that has a maximum spacing from the respective ends of said elongated opening less than the distance from said pin to the intersection of the bottom of said open ended slot with said recess, the distance from the center of said retainer member to the longitudinal sides thereof being substantially equal to the distance from the center of said transverse pin to the bottom of said open ended slot whereby the longitudinal side edges of the retainer member will be in facial contact with the bottom of said open ended slot when the retainer member is pivoted to a position with its longitudinal axis at right angles to the axis of the stem, a notch provided centrally in the outer surface for at least one side and one end of said retainer member, said recess having a diameter greater than the width of the slot, a spherical member inserted in said recess, a longitudinal groove formed in each side wall of the slot to permit insertion of the spherical member, each of said grooves being plugged after insertion of the spherical member whereby to seal the locking means from foreign matter, and a spring member in said recess urging said spherical member outwardly whereby to releasably engage one of the notches in said retainer member.

References Cited in the file of this patent

UNITED STATES PATENTS

| | | |
|---|---|---|
| 325,221 | Wright | Aug. 25, 1885 |
| 1,194,902 | Urban | Aug. 15, 1916 |
| 2,124,658 | Smith | July 26, 1938 |
| 2,660,083 | Tyson | Nov. 24, 1953 |

FOREIGN PATENTS

| | | |
|---|---|---|
| 214,049 | Australia | Mar. 18, 1958 |